(12) United States Patent
Lloyd et al.

(10) Patent No.: US 10,969,293 B2
(45) Date of Patent: *Apr. 6, 2021

(54) TESTING MECHANISM FOR VALVE REPLACEMENT AND LEAK DETECTION ON A TANK CAR

(71) Applicant: Union Tank Car Company, Chicago, IL (US)

(72) Inventors: Jay Lloyd, Illinois City, IL (US); John Kolb, Vaparaiso, IN (US); Greg Cieslak, Alexandria, LA (US); Neil Finn, Frankfort, IL (US)

(73) Assignee: Union Tank Car Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,290

(22) Filed: May 27, 2020

(65) Prior Publication Data
US 2020/0284683 A1 Sep. 10, 2020

Related U.S. Application Data

(63) Continuation of application No. 16/658,744, filed on Oct. 21, 2019, now Pat. No. 10,704,980, which is a continuation of application No. 15/080,185, filed on Mar. 24, 2016, now Pat. No. 10,571,355.

(60) Provisional application No. 62/139,474, filed on Mar. 27, 2015.

(51) Int. Cl.
*G01M 3/02* (2006.01)
*G01M 3/08* (2006.01)

(52) U.S. Cl.
CPC .......... *G01M 3/022* (2013.01); *G01M 3/025* (2013.01); *G01M 3/085* (2013.01)

(58) Field of Classification Search
CPC ...... G01M 3/022; G01M 3/025; G01M 3/085; F16L 55/12; F16L 55/124; F16L 55/134; E21B 33/127; F16K 15/20
See application file for complete search history.

(56) References Cited

U.S. PATENT DOCUMENTS

| | | | | |
|---|---|---|---|---|
| 5,771,937 A * | 6/1998 | Collins | ..................... | F16K 7/10 138/89 |
| 6,263,896 B1 | 7/2001 | Williams | | |
| 6,502,603 B2 * | 1/2003 | Lane, Jr. | ............... | F16L 55/124 138/89 |

(Continued)

*Primary Examiner* — Suman K Nath
(74) *Attorney, Agent, or Firm* — Arnold & Porter Kaye Scholer

(57) ABSTRACT

Aspects of the invention include methods and systems for a testing mechanism to be utilized when repairing and replacing a valve utilized on a tank car. The testing mechanism may comprise a pipe plug device configured to plug a siphon pipe located on a tank car and a pressure test device to conduct a leak detect test after the pipe plug device is removed from the siphon pipe. The pipe plug device may include a pipe plug bladder and a pipe plug pressure fitting to inflate and deflate the pipe plug bladder against a wall of the siphon pipe. The pressure test device may include a pressure test valve cap with a test valve bladder located on the pressure test valve cap, a bladder pressure fitting to inflate and deflate the test valve bladder, and a test pressure fitting to pressurize a valve, the test pressure fitting located on the pressure test valve cap.

23 Claims, 11 Drawing Sheets

(56) References Cited

U.S. PATENT DOCUMENTS

| | | |
|---|---|---|
| 7,597,118 B1 | 10/2009 | Peterson et al. |
| 8,256,467 B1 | 9/2012 | Larson et al. |
| 2008/0163951 A1 | 7/2008 | Lundman |
| 2012/0043074 A1* | 2/2012 | Webb, Jr. ............. E21B 33/127 166/192 |
| 2014/0366976 A1 | 12/2014 | Al Shammary |

* cited by examiner

TESTING MECHANISM FOR VALVE REPLACEMENT AND LEAK DETECTION ON A TANK CAR

CROSS-REFERENCE TO RELATED APPLICATIONS

This application is a continuation of U.S. patent application Ser. No. 16/658,744, filed Oct. 21, 2019, which is a continuation of U.S. patent application Ser. No. 15/080,185, filed Mar. 24, 2016, which claims priority to U.S. Provisional Patent Application No. 62/139,474, filed Mar. 27, 2015, all of which are herein incorporated by reference in their entirety.

BACKGROUND

Transporting commodities by common rail carrier is one of the most economical and efficient means to move commodities to destination points across North America. Some railcars transport certain commodities that are toxic and dangerous, such as petroleum crude oil type products, ethyl alcohol type products, and fuel ethanol type products. For example, inhalation of petroleum crude oil vapors may cause central nervous system problems including headaches, drowsiness, and nausea and may lead to unconsciousness or death. Additionally, petroleum crude oil may cause respiratory and eye irrigation, as well as prolonged or repeated skin contact can result in irritation and dermatitis. Further, petroleum crude oil contains Benzene, a confirmed carcinogen. Additionally, for example, high vapor concentrations of ethyl alcohol and/or fuel ethanol may cause nose, throat, and eye irritation. The ethyl alcohol and/or fuel ethanol may contain toxic denaturants, wherein exposure may lead to headache, drowsiness, nausea, dizziness, and vomiting. Inhalation of concentrations of ethyl alcohol and/or fuel ethanol above 5,000 PPM may cause transient eye and nose irritation with coughing. Skin contact with ethyl alcohol and/or fuel ethanol may result in drying and cracking due to defatting and hazardous amounts may be absorbed through severely abraded skin and be irritating to the eyes. Tank cars carrying any of these commodities or any other toxic or dangerous commodities must be treated with care and safety during all operations, to include maintenance, repair, and replacement activities.

Railroad tank cars are often equipped with valves used for top loading and unloading of tank cars. These valves are generally attached to the top fittings flange by NPT threads. The top side of the valve is supplied with another NPT connection. The valve is supplied complete with a handle. These valves must be periodically repaired and/or replaced.

When these valves must be repaired and/or replaced, generally, nitrogen gas or compressed air may be used to leak test the newly installed valves on the tank cars. The nitrogen gas or compressed air may be used to pressurize the entire tank car to ensure the newly installed valves on the tank cars are leak proof. This method of using nitrogen gas or compressed air to pressurize the entire tank car can take a significant amount of time, such as 30-60 minutes per valve or tank. Additionally, nitrogen gas can be expensive or costly, costing as much as $600-$800 per tank car per leak test.

A need therefore exists for an improved procedure and testing mechanism for the valve replacement and leak detection on a tank car.

SUMMARY OF THE INVENTION

The following presents a general summary of aspects of the invention in order to provide a basic understanding of the invention and various features of it. This summary is not intended to limit the scope of the invention in any way, but it simply provides a general overview and context for the more detailed description that follows.

According to aspects of this invention, a testing mechanism to be utilized when repairing and replacing a valve utilized on a tank car, the testing mechanism may comprise a pipe plug device and a pressure test device. The pipe plug device may be configured to plug a siphon pipe located on a tank car. The pipe plug device may include a pipe plug bladder and a pipe plug pressure fitting to inflate and deflate the pipe plug bladder against a wall of the siphon pipe. When the pipe plug bladder is deflated, the pipe plug bladder is sized to fit and slide inside the siphon pipe. When the pipe plug bladder is inflated, the pipe plug bladder is sized to expand and tighten against the wall of the siphon pipe. The pressure test device may conduct a leak detect test after the pipe plug device is removed from the siphon pipe. The pressure test device may include a pressure test valve cap with a test valve bladder located on the pressure test valve cap, a bladder pressure fitting to inflate and deflate the test valve bladder, and a test pressure fitting to pressurize a valve, the test pressure fitting located on the pressure test valve cap.

Additionally, another aspect of this invention may relate to a testing method comprising the steps of: 1) remove a valve cap from a first valve located on a tank car; 2) open the first valve; 3) insert and flow nitrogen gas into a siphon pipe located on the tank car below the first valve; 4) place a pipe plug bladder through the first valve, wherein the pipe plug bladder is located below the bottom of the first valve and against a wall of the siphon pipe; 5) apply a bladder pressure to the pipe plug bladder to inflate the pipe plug bladder to tighten the pipe plug bladder against the wall of the siphon pipe; 6) remove the first valve and replace the first valve with a second valve, wherein the second valve is installed in an open position; 7) deflate the pipe plug bladder and remove the pipe plug bladder from the second valve and the siphon pipe; 8) insert a pressure test device into the second valve, wherein the pressure test device includes a pressure test valve cap with a test valve bladder located on the pressure test valve cap, a bladder pressure fitting to inflate and deflate the test valve bladder, and a test pressure fitting to pressurize a valve; 9) apply the bladder pressure to the test valve bladder to inflate the test valve bladder to tighten the test valve bladder against the wall of the siphon pipe; 10) apply a test pressure through the pressure test valve cap; 11) conduct a bubble leak inspection of the valve; 12) release the test pressure; 12) deflate the test valve bladder; and remove the pressure test device.

Additionally, another aspect of this invention may relate to a safety method for valve replacement and leak detection on a tank care, the method may comprise the steps of: 1) open a first valve located on a tank car; 2) insert a pipe plug device through the first valve, wherein the pipe plug device includes a pipe plug bladder and a pipe plug pressure fitting to inflate and deflate the pipe plug bladder against a wall of a siphon pipe, wherein when the pipe plug bladder is deflated, the pipe plug bladder is sized to fit and slide inside the siphon pipe and when the pipe plug bladder is inflated, the pipe plug bladder is sized to expand and tighten against the wall of the siphon pipe, and further wherein the pipe plug bladder is located below the bottom of the first valve and against a wall of the siphon pipe; 3) apply a bladder pressure to the pipe plug pressure fitting to inflate the pipe plug bladder to tighten the pipe plug bladder against the wall of the siphon pipe; 4) remove the first valve and replace the first valve with a second valve, wherein the second valve is installed in an open position; 5) deflate the pipe plug bladder and remove the pipe plug bladder and the pipe plug device from the second valve and the siphon pipe; 6) insert a pressure test device into the second valve, wherein the pressure test device includes a pressure test valve cap with a test valve bladder located on the pressure test valve cap, a bladder pressure fitting to inflate and deflate the test valve bladder, and a test pressure fitting to pressurize a valve, the test pressure fitting located on the pressure test valve cap; 7) apply the bladder pressure to the bladder pressure fitting to inflate the test valve bladder to tighten the test valve bladder against the wall of the siphon pipe; 8) apply a test pressure through the pressure test valve cap; 9) conduct a bubble leak inspection of the valve; 10) release the test pressure; 11) deflate the test valve bladder; and 12) remove the pressure test device.

BRIEF DESCRIPTION OF THE DRAWINGS

A more complete understanding of the present invention and certain advantages thereof may be acquired by referring to the following detailed description in consideration with the accompanying drawings, in which.

Figure 1:
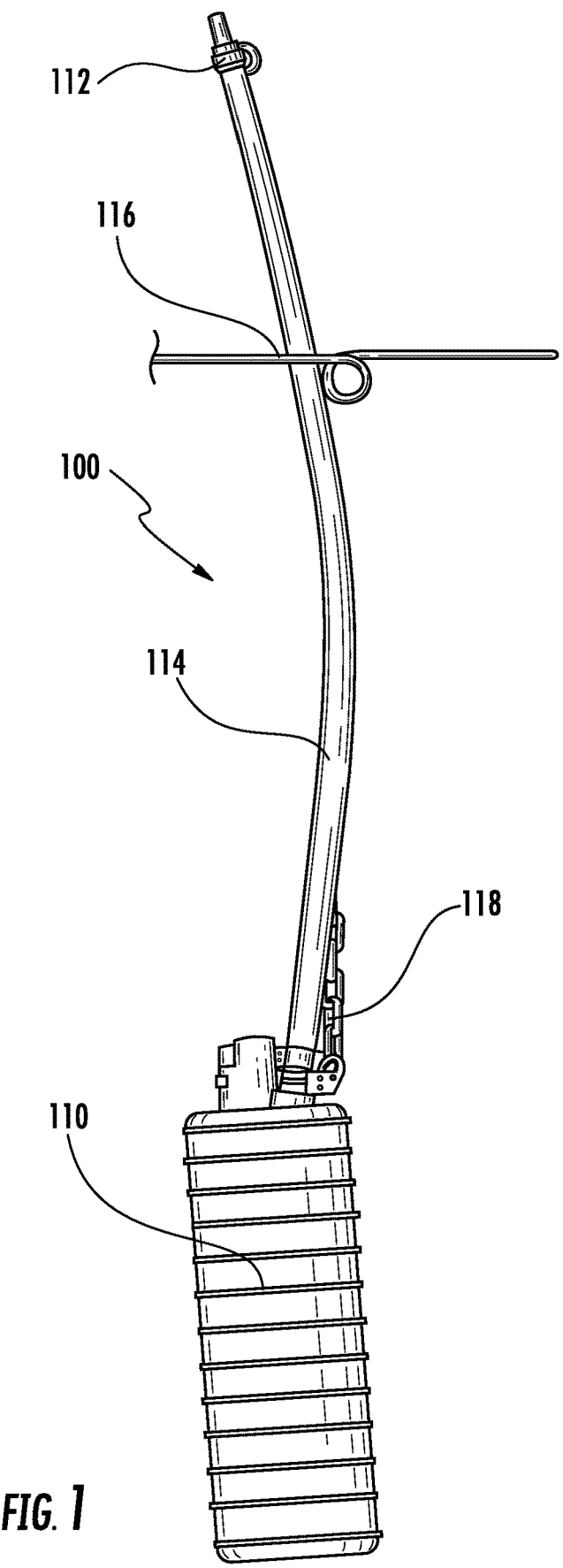
FIG. 1 is a view of a pipe plug bladder device in accordance with an embodiment of the present invention.

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

A testing mechanism may be utilized when repairing and/or replacing a valve 10 utilized on a tank car. The testing mechanism may include a pipe plug device 100 and a pressure test device 200. Generally, the pipe plug device 100 may be utilized to plug and block a siphon pipe 20 as part of a tank car in order to change and/or replace a valve 10 on the tank car. After the existing valve 10 is replaced with a replacement valve 30, the pipe plug device 100 may be removed and the pressure test device 200 may then be installed. Generally, the pressure test device 200 may be utilized to conduct a bubble leak detect test on the replacement valve 30 fittings.

Figure 2:
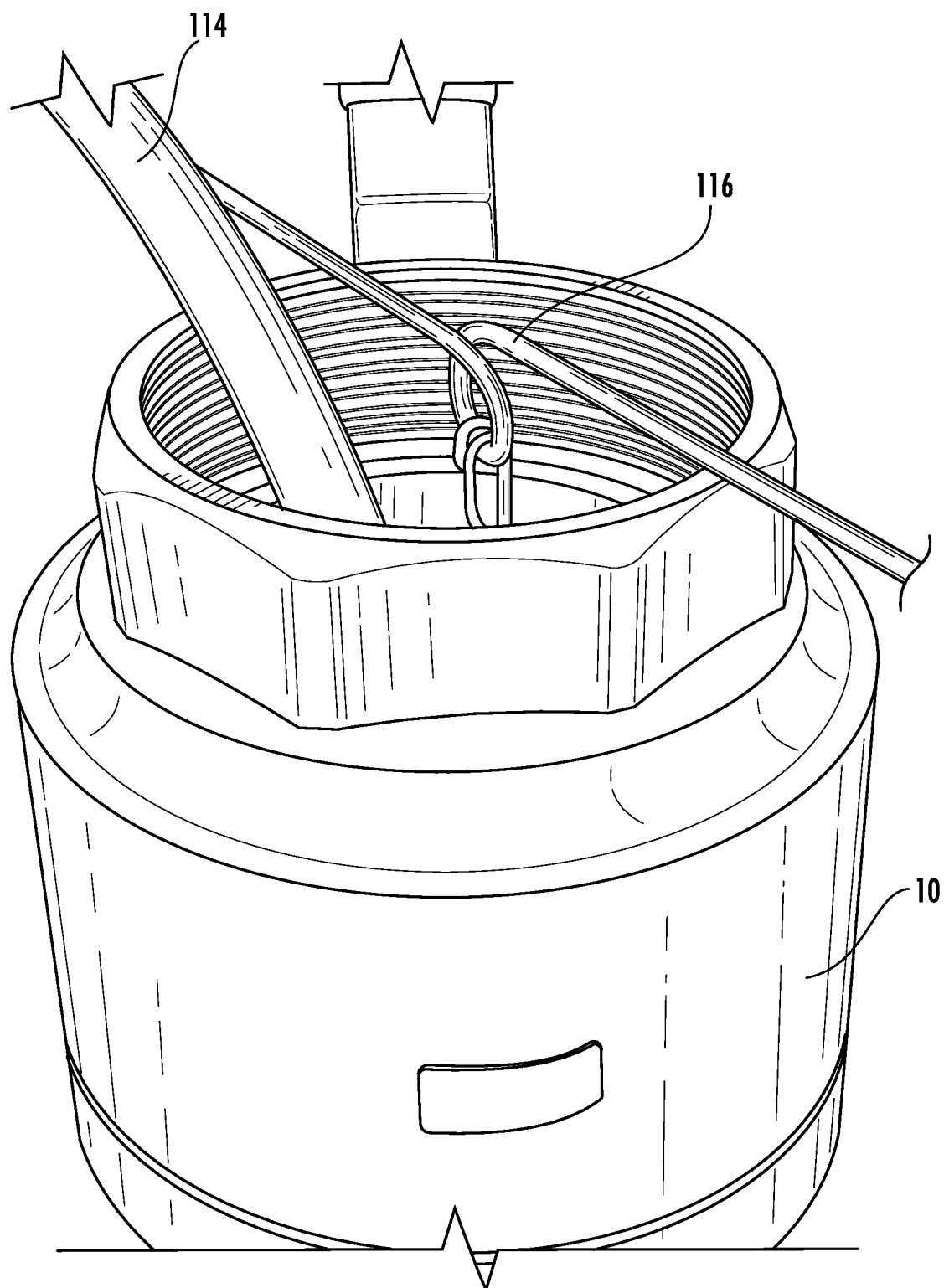
FIG. 2 is a view of the pipe plug bladder device of FIG. 1 being left in place during the removal and installation of valves in accordance with an embodiment of the present invention.
Figure 3:
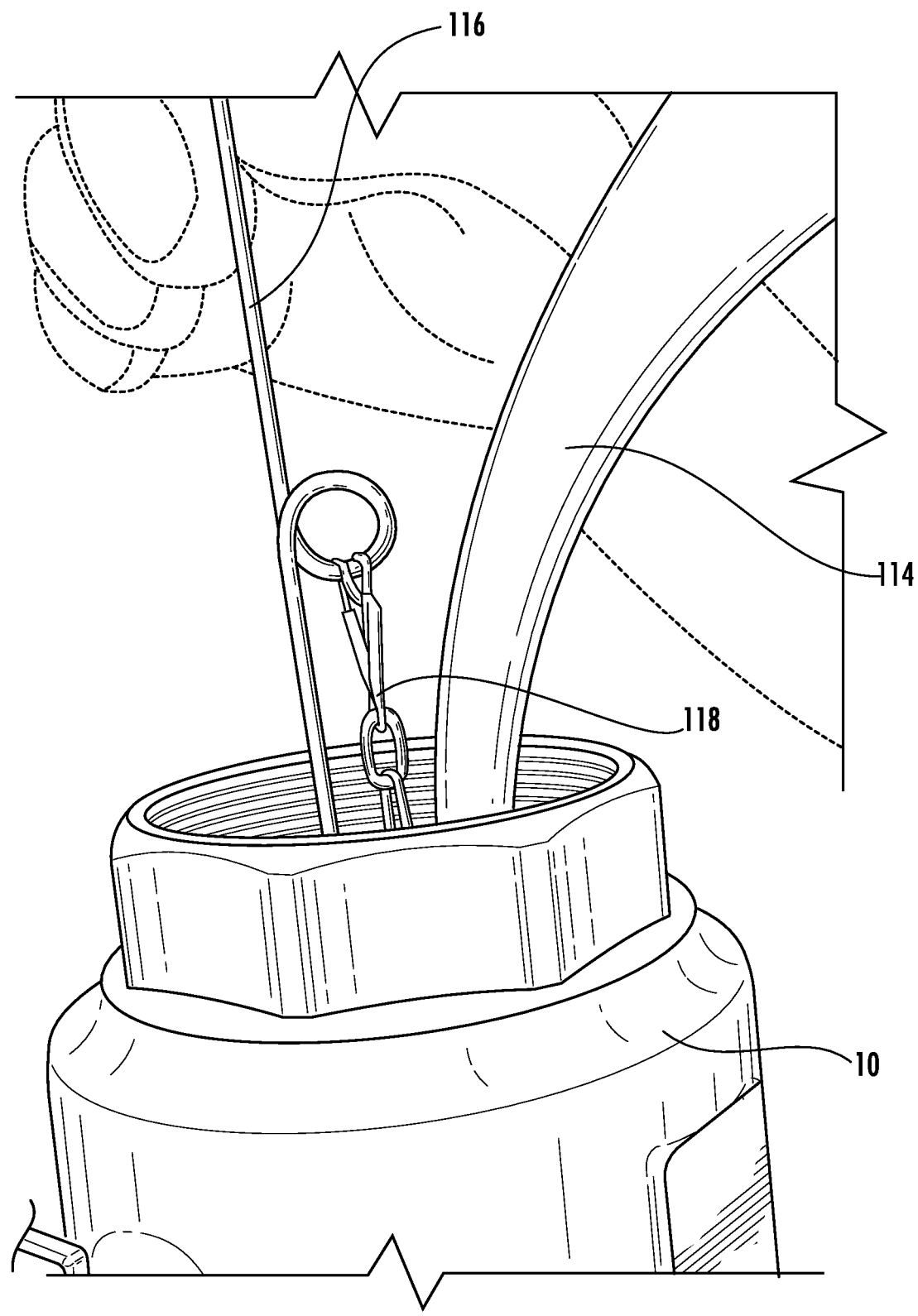
FIG. 3 is another view of the pipe plug bladder device of FIG. 1 being removed from the valve in accordance with an embodiment of the present invention.
Figure 4:
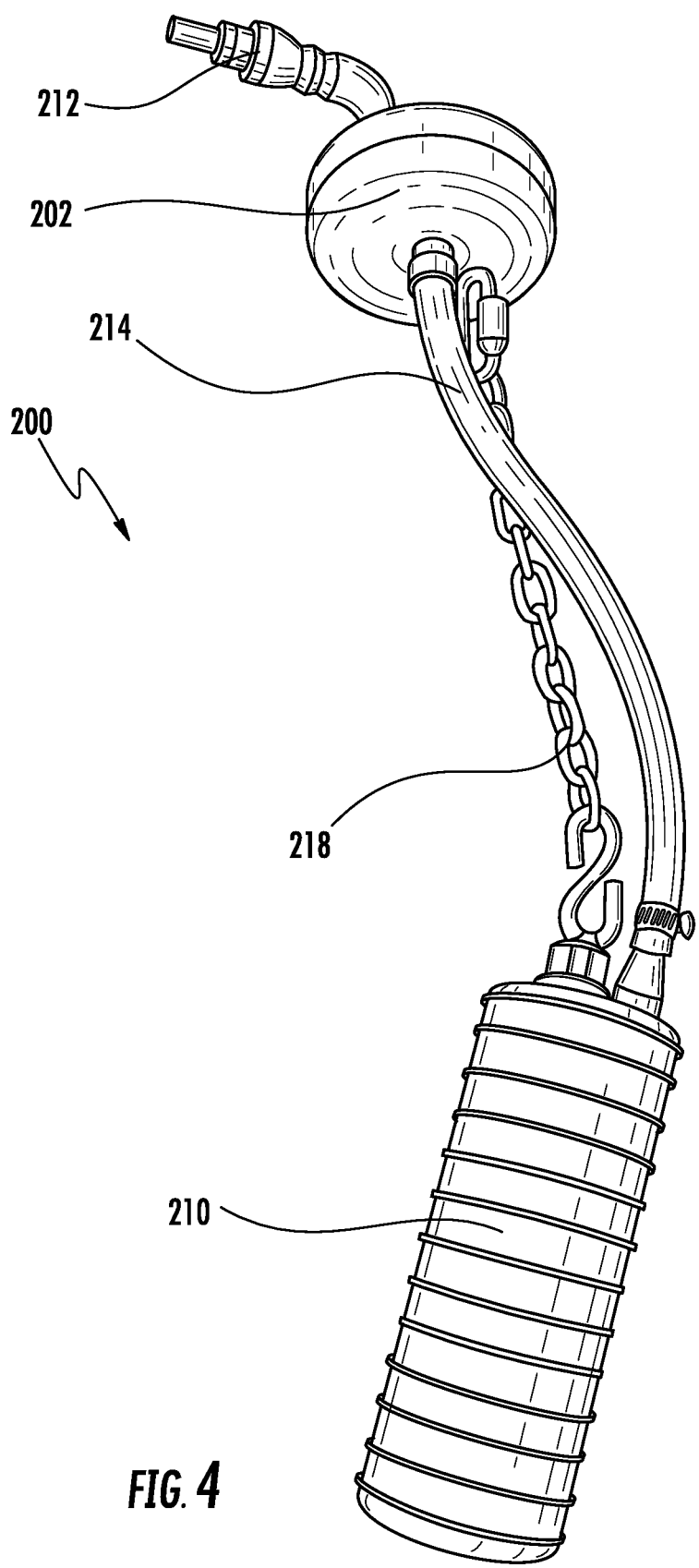
FIG. 4 is a view of a pressure test device in accordance with an embodiment of the present invention.
Figure 5:
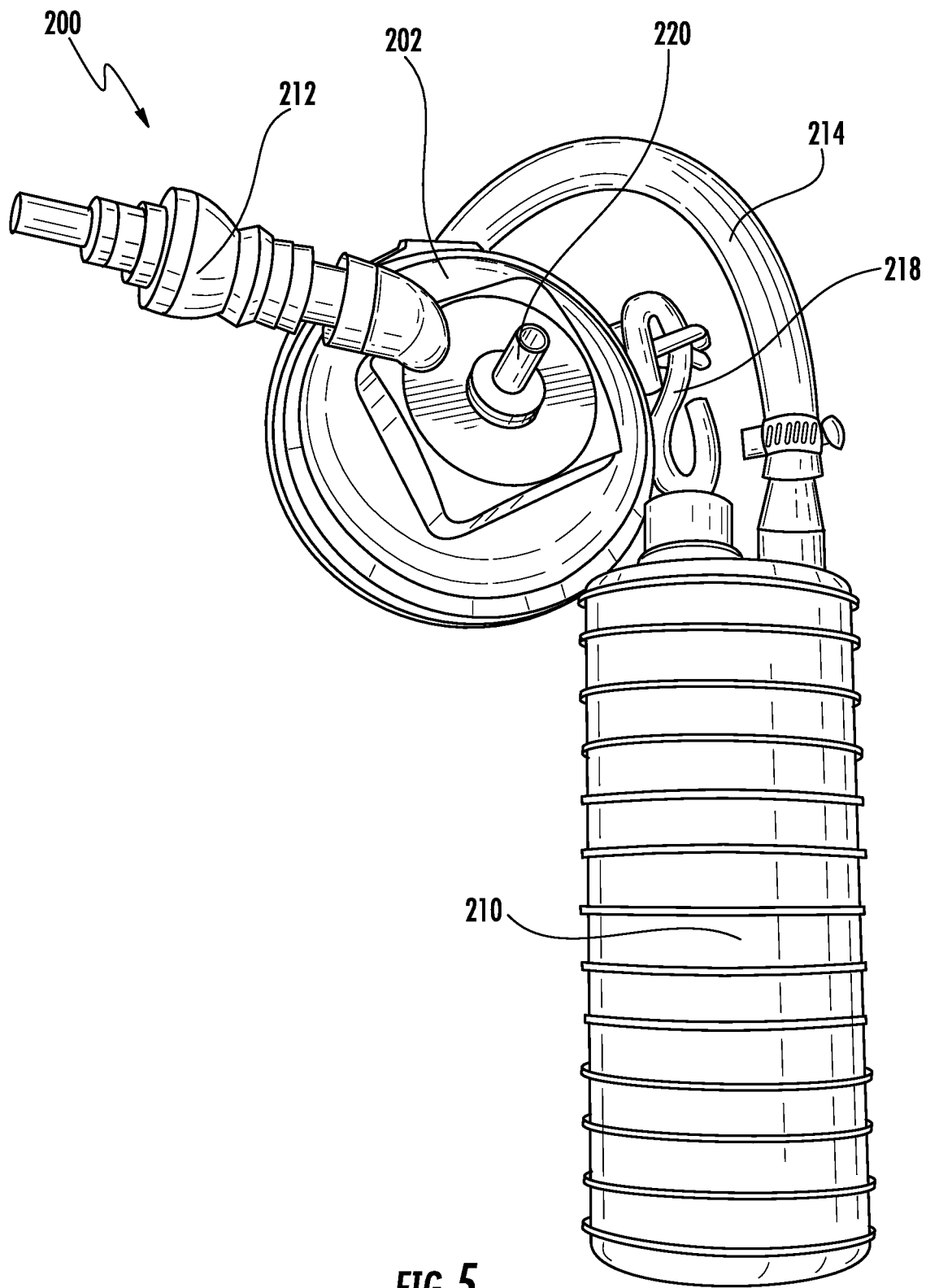
FIG. 5 is another view of the pressure test device of FIG. 4 in accordance with an embodiment of the present invention.
Figure 6:
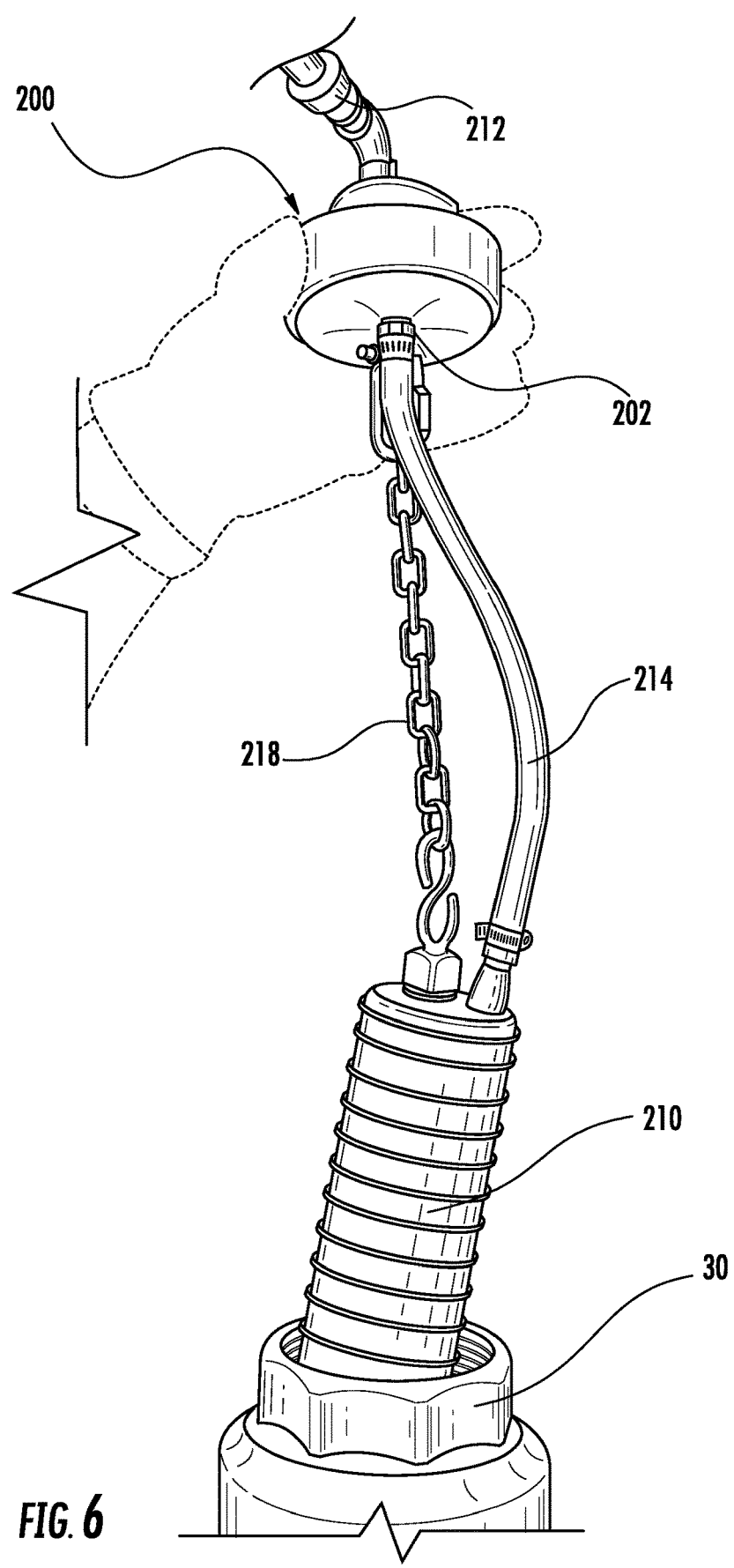
FIG. 6 is a view of the pressure test device of FIG. 4 being dropped into the replacement valve in accordance with an embodiment of the present invention.
Figure 7:
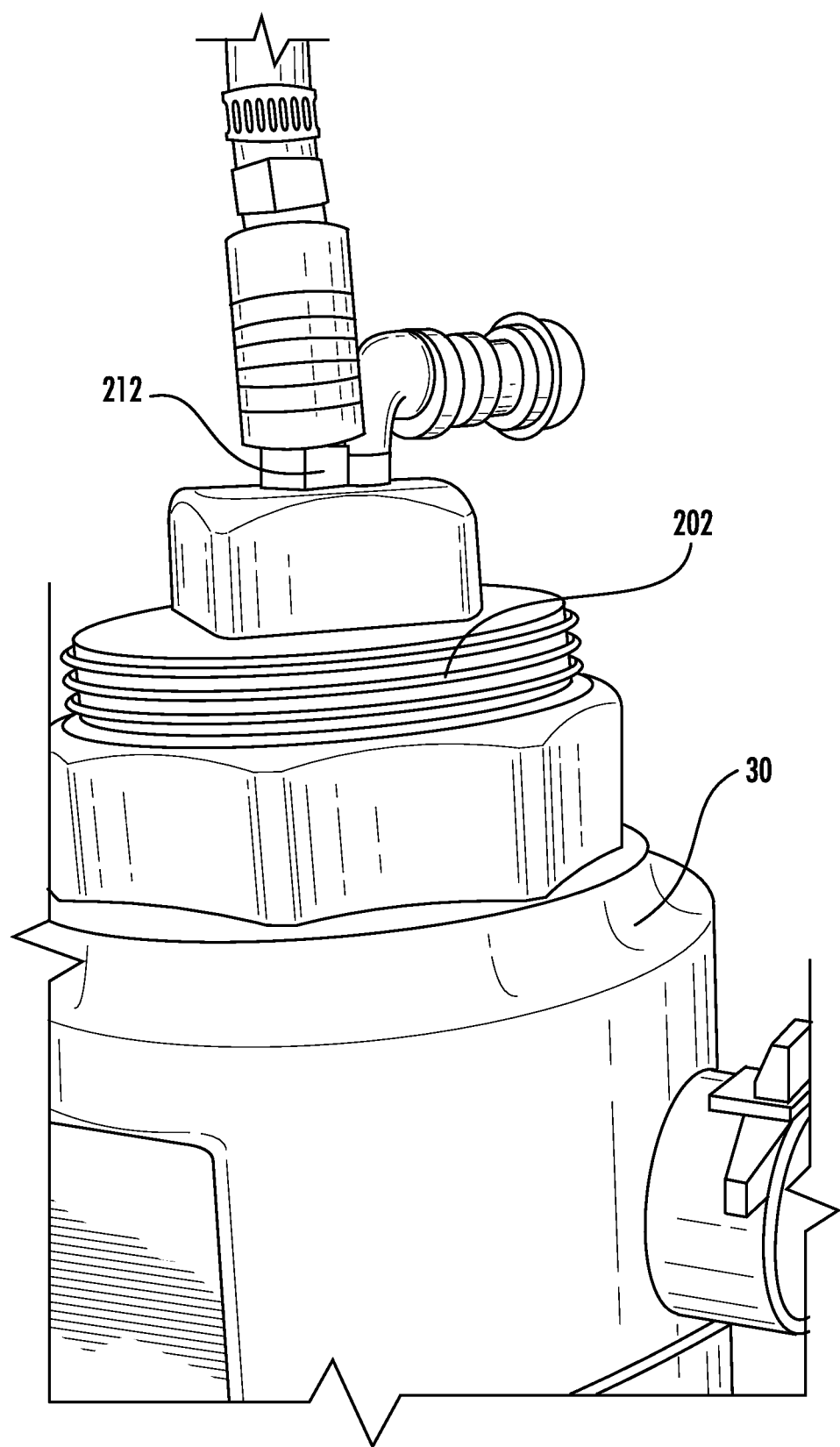
FIG. 7 is a close-up view of the top of the pressure test device of FIG. 4 installed in the valve in accordance with an embodiment of the present invention.

As illustrated in FIGS. 1-3, the pipe plug device 100 may include a pipe plug bladder 110 and a pipe plug pressure fitting 112 to inflate/deflate the pipe plug bladder 110. The pipe plug bladder 110 may be sized to fit and slide inside the siphon pipe 20 when deflated. The pipe plug bladder 110 may be sized to expand and tighten against the siphon pipe wall 20 when the pipe plug bladder 110 is inflated. The pipe plug bladder 110 may be inflated with approximately 40 psig, or any other similar pressure to ensure that the pipe plug bladder 110 is tightened against the siphon pipe wall 20.

The pipe plug device 100 may also include a rubber hose 114 that connects the pipe plug bladder 110 and the pipe plug pressure fitting 112. The length of the hose 114 may be approximately 9 inches or other various lengths without departing from this invention. The pipe plug device 100 may also include a "T" handle 116 that is shaped to span across the opening of the valve 10. The "T" handle 116 may include a chain 118 that connects to the "T" handle 116 and the pipe plug bladder 110 to ensure that the pipe plug bladder 110 is not dropped or lost in the tank car. The length of the chain 118 may be approximately 9 inches or other various lengths without departing from this invention.

As illustrated in FIGS. 4-9, the pressure test device 200 may include a pressure test valve cap 202 with a test valve bladder 210, a bladder pressure fitting 212 to inflate/deflate the test valve bladder 210, and a test pressure fitting 220 to pressurize the body of the valve 30. The test valve bladder 210 may be sized to fit and slide inside the siphon pipe 20 when deflated. The test valve bladder 210 may be side to expand and tighten against the siphon pipe wall 20 when the test valve bladder 210 is inflated. The test valve bladder 210 may be inflated with approximately 40 psig, or any other similar pressure to ensure that the test valve bladder 210 is tightened against the siphon pipe wall 20. The bladder pressure fitting 212 may be located on the pressure test valve cap 202. The test pressure fitting 220 may be located on the pressure test valve cap 202.

The pressure test device 200 may also include a rubber hose 214 that connects the test valve bladder 210 and the bladder pressure fitting 212. The length of the hose 214 may be approximately 9 inches or other various lengths without departing from this invention. The pressure test device 200 may also include a chain 218 that connects the bottom of the pressure test cap 202 and the test valve bladder 210 to ensure that the test valve bladder 210 is not dropped or lost in the tank car. The length of the chain 218 may be approximately 9 inches or other various lengths without departing from this invention.

Described below is a detailed description of additional aspects of this invention, specifically a method of leak testing an installed valve 30 on a tank car or rail car. Additional aspects of this disclosure relate to methods of replacing a valve 10 on a residue tank car containing a toxic commodity in accordance with examples of this disclosure. Such methods may include, for example, one or more of the following steps in any desired order and/or combinations as explained below.

The first step includes removing the valve cap from the existing valve 10 using non-sparking tools and opening the existing valve 10. Immediately following the removal of the valve cap and opening the existing valve 10, the next step may be to insert and flow nitrogen gas into the siphon pipe 20 for a set amount of time, such as for 60 seconds. This flow of nitrogen gas into the siphon pipe 20 creates a barrier and helps to not allow the toxic fumes or commodity to escape from the tank car.

Following the flowing of nitrogen gas into the siphon pipe 20, the next step is placing the pipe plug bladder 110 through the open valve 10 and applying a bladder pressure of nitrogen gas to the pipe plug bladder 110 to tighten the pipe plug bladder 110 against the siphon pipe wall 20. The bladder pressure may be regulated for example 40 psig or any other similar pressure to ensure that the pipe plug bladder 110 is tightened against the siphon pipe wall 20. Additionally, the pipe plug bladder 110 should be located just below the bottom of the valve 10 and against the siphon pipe wall 20.

After the pipe plug bladder 110 is tightened and pressurized against the siphon pipe wall 20, a measurement of the toxicity levels may be taken to ensure that the pipe plug bladder 110 is tightened adequately enough. For example, allowing 60 seconds and measuring the LEL readings within 2 feet of the valve 10. A gas detection meter may be utilized to measure the toxicity level or LEL reading. The gas detection meter may remain within 2 feet of the valve 10 to continuously monitor for LEL/LFL being less than 10% (generally—a 10% to 20% reading requires supplied air respirator with hip escape bottle).

The next step may be removing the valve 10 with a non-sparking wrench and replacing the valve 10 with an approved replacement valve 30. The replacement valve 30 should be installed in the open position with the cap plug removed. The replacement valve 30 may slide over the bladder chain "T" handle and hose. Once installed on the tank car, the replacement valve 30 may be tightened on the tank car.

After the replacement valve 30 is installed and tightened on the tank car, the next step is deflating the pipe plug bladder 110 and removing the pipe plug bladder device 110 from the replacement valve 30 and the siphon pipe 20. The pipe plug bladder 110 can be deflated at the pressure fitting 112 utilized to add/release the pipe plug bladder pressure.

Following the removal of the pipe plug bladder device 100, the next step is inserting the pressure test device 200 into the replacement valve 30. The pressure test valve cap portion 200 of the pressure test device 200 will screw into the NPT threads on the top portion of the replacement valve 30. The pressure test device 200 may be screwed and tightened onto the NPT threads on the top portion of the replacement valve 30. After the pressure test device 200 is tightened onto the replacement valve 30, the next step is inflating the test valve bladder 210. The test valve bladder 210 may be inflated with nitrogen gas through the valve cap bladder fitting 212. The test valve bladder 210 may be inflated to a test bladder pressure, for example 40 psig, or any other similar pressure to ensure that the test valve bladder 210 is tightened against the siphon pipe wall 20. Additionally, the test valve bladder 212 should be located just below the bottom of the valve 30 and against the siphon pipe wall 20.

After the test valve bladder 212 is inflated and tightened against the siphon pipe wall 20, the next step is applying pressure through the pressure test valve cap fitting 220. The valve hose pressure may be reset to a lower pressure, such as approximately 30 psig. The pressure may be applied from the valve hose pressure and the pressure regulator through the pressure test valve cap fitting 220 to a test pressure, for example 30 psig, or any other similar pressure to conduct the bubble leak inspection.

Figure 8:
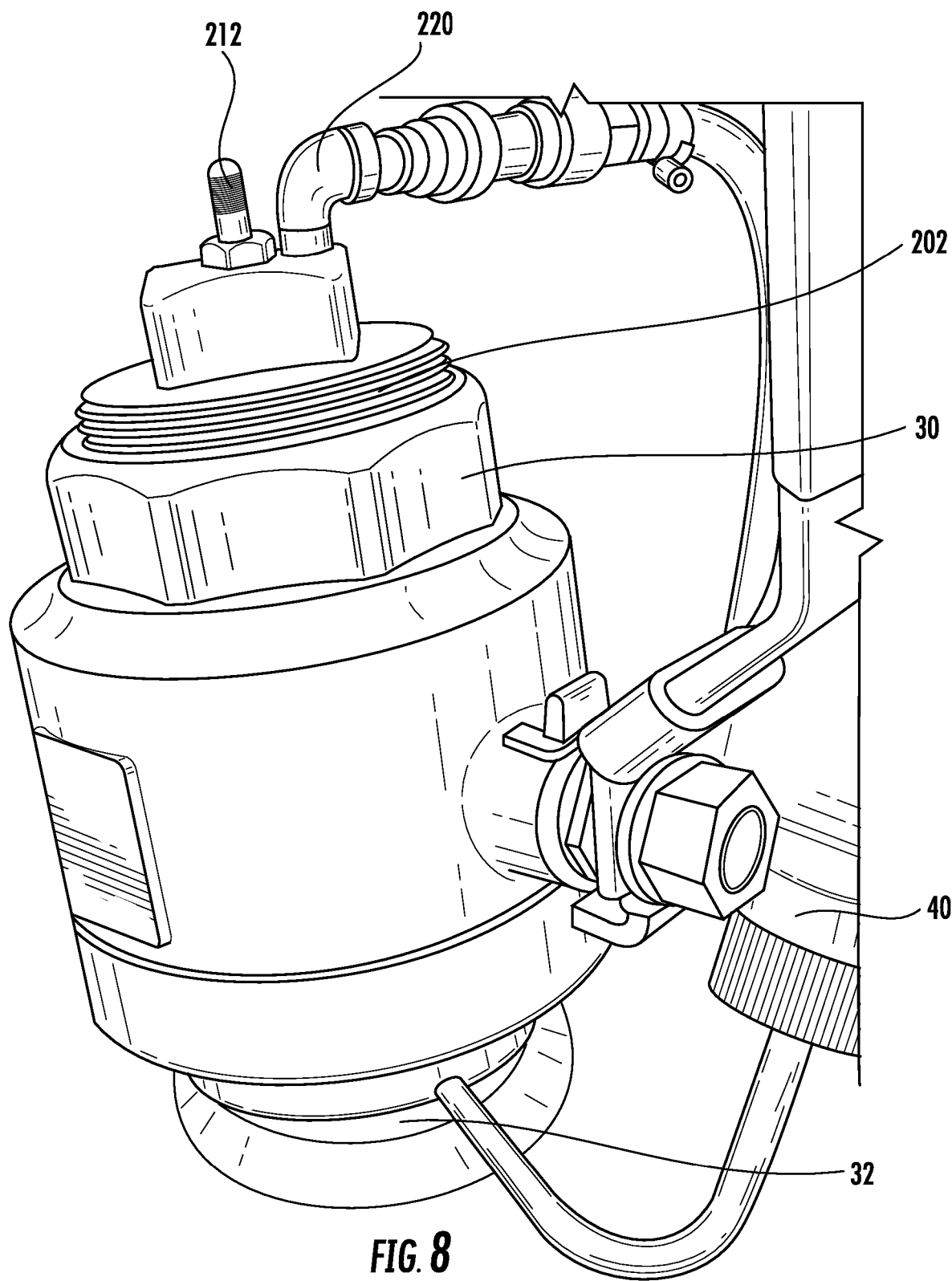
FIG. 8 is another close-up view of the top of the pressure test device of FIG. 4 installed in the valve in accordance with an embodiment of the present invention.
Figure 9:
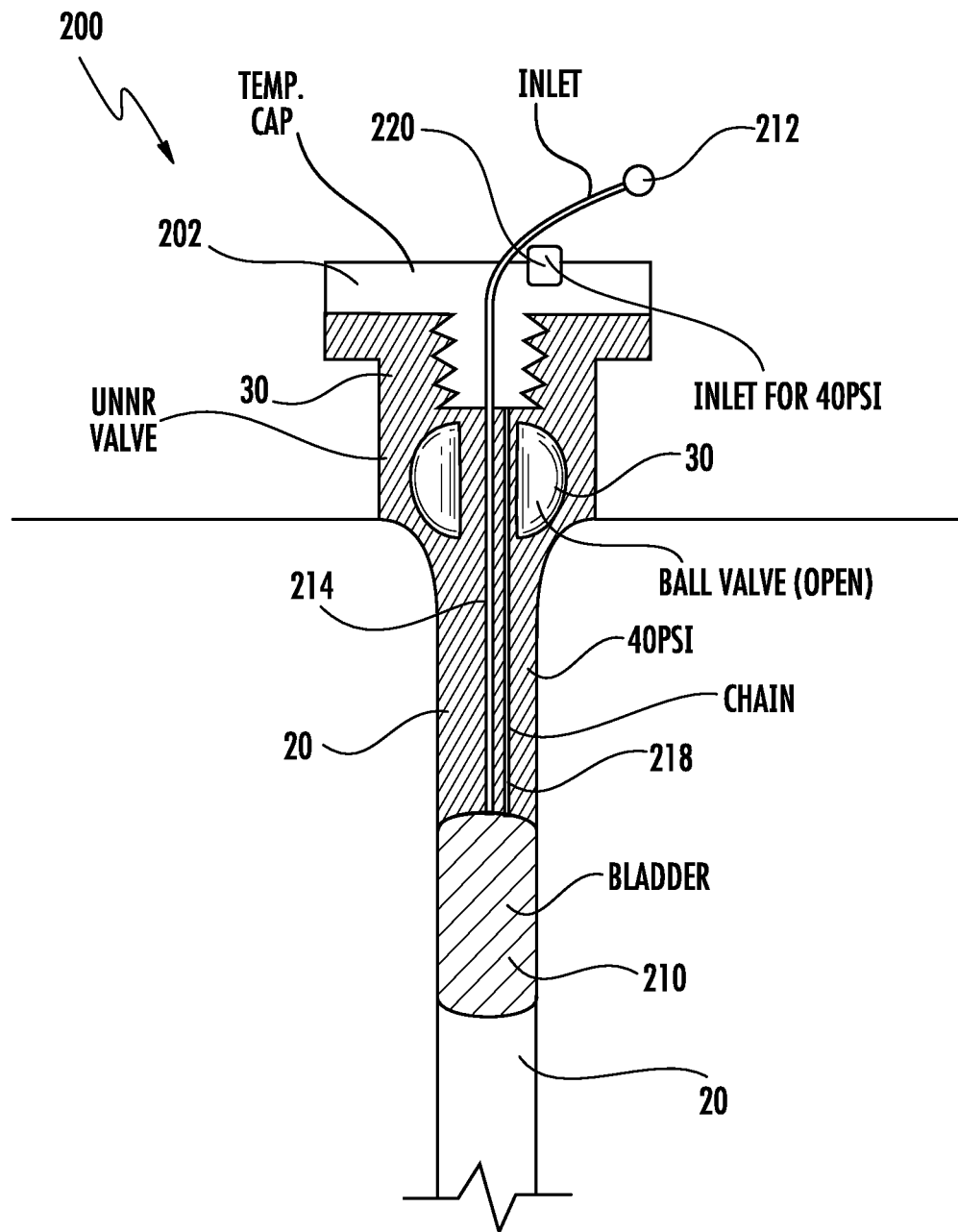
FIG. 9 is a view of the pressure test device of FIG. 4 installed in the valve in accordance with an embodiment of the present invention.
Figure 10:
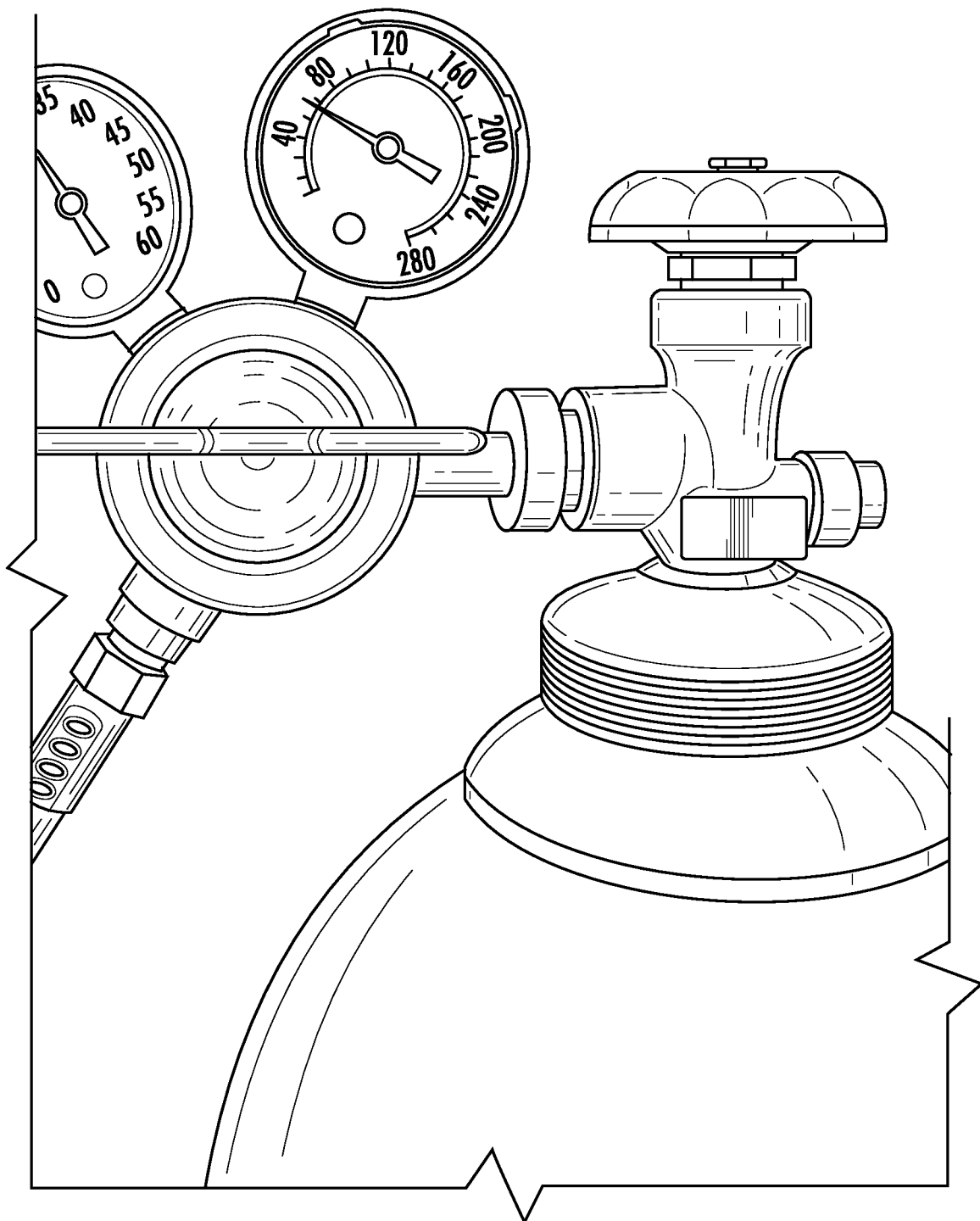
FIGS. 10 and 11 are views of a pressure system for providing the pressure to the pipe plug bladder device and the pressure test device in accordance with an embodiment of the present invention.
Figure 11:
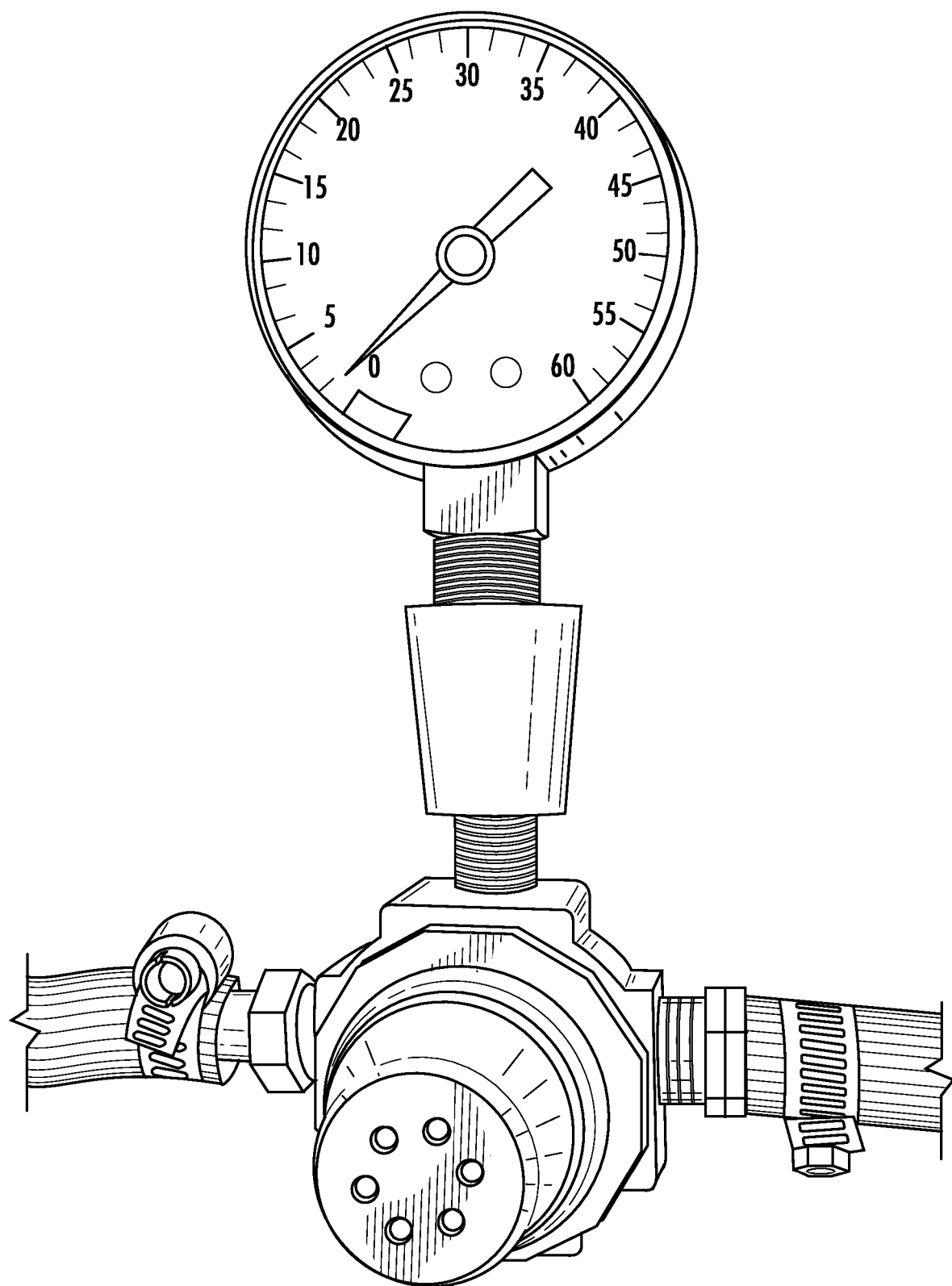

After the pressure is applied through the pressure test valve cap fitting 220, the next step is conducting a bubble leak inspection of the valve threading 32. As illustrated in FIG. 8, the bubble leak inspection of the valve threading 32 may include utilizing leak or bubble liquid 40 on the valve threading 32. If there is leakage at the valve threading 32, the liquid 40 will bubble at the valve threading 32. If there is no bubbling at the valve threading 32, there is no leakage at the valve threading 32. The test pressure may be maintained at the test pressure level, such as 30 psig throughout the test.

After the test is complete, the test pressure may be released first and then release the test bladder pressure. If the pressure test valve cap 202 is difficult to remove following the test pressure and test bladder pressure being released, the operator should stop and ensure the bladder pressure is released. Removing the pressure test valve cap 202 with the test valve bladder 212 under pressure may damage the pressure test device 200 or the replacement valve 30.

The pressure test device 200 may then be removed with a non-sparking wrench and pulling out the pressure test bladder 210 from the replacement valve 30. The replacement valve 30 may then be closed and the replacement valve cap may then be reapplied.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

What is claimed is:

1. A testing mechanism to be utilized when replacing a valve utilized on a tank car, the testing mechanism comprising:
   a pipe plug device configured to inflate and plug a pipe located on a tank car, the pipe plug device including a pipe plug bladder and a pipe plug pressure fitting to inflate the pipe plug bladder against a wall of the pipe, wherein the pipe plug device is used when removing a first valve and replacing the first valve with a replacement valve; and a pressure test device to conduct a leak detect test on the replacement valve after the pipe plug device is removed from the pipe, the pressure test device including a pressure test valve cap and a test valve bladder located on the lower end of the replacement valve, a bladder pressure fitting connected by a hose to the test valve bladder and connected through the pressure test valve cap, the bladder pressure fitting receives a bladder pressure to inflate and deflate the test valve bladder, and a test pressure fitting that receives a test pressure to pressurize the replacement valve to detect a leak in the replacement valve, the test pressure fitting and the bladder pressure fitting located separately on the pressure test valve cap.

2. The testing mechanism of claim 1, wherein the pipe plug bladder is inflated to 40 psig to ensure the pipe plug bladder is tightened against the wall of the pipe.

3. The testing mechanism of claim 2, wherein when the pipe plug bladder is inflated, the pipe plug bladder is sized to expand and tighten against the wall of the pipe.

4. The testing mechanism of claim 3, wherein when the pipe plug bladder is deflated, the pipe plug bladder is sized to fit and slide inside the pipe.

5. The testing mechanism of claim 1, wherein the pipe plug device includes a T-handle that is shaped to span across an opening on the valve, wherein the T-handle includes a chain that connects to the T-handle and the pipe plug bladder to ensure the pipe plug bladder is not dropped in the tank car.

6. The testing mechanism of claim 1, wherein the bladder pressure is 40 psig to ensure the test valve bladder is tightened against the wall of the pipe.

7. The testing mechanism of claim 1, wherein the test pressure is 30 psig.

8. The testing mechanism of claim 1, wherein the length of the hose is 9 inches long.

9. The testing mechanism of claim 1, wherein the test pressure device includes a chain that connects to the pressure test cap and the test valve bladder to ensure that the test valve bladder is not dropped in the tank car.

10. A testing mechanism to be utilized when repairing a valve utilized on a tank car, the testing mechanism comprising:

a pipe plug device configured to inflate and plug a pipe located on a tank car, the pipe plug device including a pipe plug bladder and a pipe plug pressure fitting to inflate the pipe plug bladder against a wall of the pipe, wherein the pipe plug device is used when removing a valve and reinstalling the valve that has been repaired; and a pressure test device to conduct a leak detect test on the repaired valve after the pipe plug device is removed from the pipe, the pressure test device including a pressure test valve cap and a test valve bladder located on the lower end of the replacement valve, a bladder pressure fitting connected by a hose to the test valve bladder and connected through the pressure test valve cap, the bladder pressure fitting receives a bladder pressure to inflate and deflate the test valve bladder, and a test pressure fitting that receives a test pressure to pressurize the repaired valve to detect a leak in the repaired valve, the test pressure fitting and the bladder pressure fitting located separately on the pressure test valve cap.

11. The testing mechanism of claim 10, wherein the pipe plug bladder is inflated to 40 psig to ensure the pipe plug bladder is tightened against the wall of the pipe.

12. The testing mechanism of claim 11, wherein when the pipe plug bladder is inflated, the pipe plug bladder is sized to expand and tighten against the wall of the pipe.

13. The testing mechanism of claim 12, wherein when the pipe plug bladder is deflated, the pipe plug bladder is sized to fit and slide inside the pipe.

14. The testing mechanism of claim 10, wherein the pipe plug device includes a T-handle that is shaped to span across an opening on the valve, wherein the T-handle includes a chain that connects to the T-handle and the pipe plug bladder to ensure the pipe plug bladder is not dropped in the tank car.

15. The testing mechanism of claim 10, wherein the bladder pressure is 40 psig to ensure the test valve bladder is tightened against the wall of the pipe.

16. The testing mechanism of claim 10, wherein the test pressure is 30 psig.

17. The testing mechanism of claim 10, wherein the length of the hose is 9 inches long.

18. The testing mechanism of claim 10, wherein the test pressure device includes a chain that connects to the pressure test cap and the test valve bladder to ensure that the test valve bladder is not dropped in the tank car.

19. A pressure test device to conduct a leak detect test when repairing or replacing a valve utilized on a tank car, the pressure test device comprising:

a pressure test valve cap;

a test valve bladder located on the lower end of a replacement valve or a repaired valve;

a bladder pressure fitting connected by a hose to the test valve bladder and connected through the pressure test valve cap, the bladder pressure fitting receives a bladder pressure to inflate and deflate the test valve bladder within a pipe, and a test pressure fitting that receives a test pressure to pressurize the replacement valve or the repaired valve to detect a leak in the replacement valve or the repaired valve, the test pressure fitting and the bladder pressure fitting located separately on the pressure test valve cap, wherein the test pressure is less than the bladder pressure.

20. The pressure test device of claim 19, wherein the bladder pressure is 40 psig to ensure the test valve bladder is tightened against the wall of the pipe.

21. The pressure test device of claim 19, wherein the test pressure is 30 psig.

22. The pressure test device of claim 19, wherein the length of the hose is 9 inches long.

23. The pressure test device of claim 19 further including:

a chain that connects to the pressure test cap and the test valve bladder to ensure that the test valve bladder is not dropped in the tank car.

* * * * *